Patented June 15, 1954

2,681,299

UNITED STATES PATENT OFFICE 2,681,299

MANUFACTURE OF DESIZING AGENTS

Eduard Schubert, Munchenstein, near Basel, Switzerland, assignor to Schweizerische Ferment A. G., Basel, Switzerland, a Swiss company No Drawing. Application December 6, 1949, Serial No. 131,495

Claims priority, application Switzerland June 11, 1949

15 Claims. (Cl. 195—64)

This invention is concerned with improvements in or relating to the manufacture of desizing agents.

In my copending application No. 131,494, now Patent No. 2,599,867, there are described a desizing agent comprising amylase, common salt and calcium sulphate, for example gypsum and methods of manufacturing such an agent.

As a result of further experiments I have found that the addition to desizing agents containing either bacterial or pancreatic amylase of one or more vegetable albumen-containing substances, in particular, vetch flour, lupin flour, bean flour, soya flour and the like, results in a considerable improvement of the desizing properties of the agents; preferably the desizing agents also contain calcium sulphate, for example in the form of gypsum. The improved desizing agents according to the invention have increased stability on storage and, when used in liquid form as in a desizing bath, the liquids exhibit better wetting power than known desizing agents and are more resistant to the deleterious effect of added wetting agents.

Accordingly the invention comprises a desizing agent comprising amylase, common salt and one or more vegetable albumen-containing substances.

According to a further feature of the invention the desizing agent also comprises calcium sulphate, for example in the form of gypsum.

According to a still further feature of the invention there is provided a method of manufacturing desizing agents which comprises mixing pancreatic or bacterial amylase, common salt and one or more vegetable albumen containing substances, with or without the addition of calcium sulphate, for example in the form of gypsum.

According to yet another feature of the invention there is provided a method of manufacturing a pancreas preparation adapted for use as a desizing agent, in which pulped pancreas glands, common salt and one or more vegetable albumen containing substances are mixed together either in the presence or absence of calcium sulphate, for example in the form of gypsum, and the resultant mixture is dried, ground and if desired defatted.

Examples of vegetable albumen containing substances which may be used are lupin flour, bean flour, soya flour, vetch flour and the like. I prefer that the quantity of common salt in the desizing agent should be within the range of from 20–70%, although larger quantities may be used.

The invention also comprises a desizing bath containing a desizing agent according to the invention.

In order that the invention may be well understood the following examples are given only as illustrations:

Example 1

100 gms. of vetch flour and 700 gms. of common salt are added to 200 gms. of a suitable solid preparation of bacterial amylase. This mixture is stable without the addition of any conserving agent.

Example 2

100 gms. of dry, degreased, pancreatin powder are mixed with 100 gms. of lupin flour and 80 gms. of common salt.

Example 3

100 gms. of dry, degreased pancreatin powder are mixed with 200 gms. of gypsum powder, 100 gms. of soya flour and 600 gms. of common salt.

Example 4

100 gms. of dry, degreased pancreatin powder are mixed with 200 gms. of gypsum powder, 60 gms. of soya flour and 40 gms. of lupin flour.

Example 5

A paste of pancreatic glands is mixed with double the quantity of lupin flour, and the resulting solid mass is dried in an air stream.

After drying, the mass is finely ground and if desired degreased with acetone. The resulting powder is then treated with such quantities of common salt and gypsum that the gypsum content is about 25%.

As seen in the foregoing examples and description, the amount of sodium chloride may vary from 20% in the dry preparation and the amount of the amylase preparation may vary from about 10% to about 36%, the ratio of flour to amylase being at least about 1 to 2. As is shown in Examples 2, 3 and 4 above equally good results are obtained with ratios of flour to amylase of about 1 to 1. In the total weight of the dry preparation up to about 25% of gypsum may be used in addition to the sodium chloride which is present.

What I claim is:

1. A desizing agent comprising essentially about 10 to 36% of amylase selected from the group consisting of bacterial amylase and pancreatic amylase, about 20–70% of common salt, at least one vegetable albumen-containing substance and up to about 25% calcium sulphate, the ratio of said albumen-containing substance to amylase being at least about 1 to 2.

2. A desizing agent comprising essentially about 10 to 36% of amylase selected from the group consisting of bacterial amylase and pancreatic amylase, about 20-70% of common salt and at least one member selected from the group consisting of lupin flour, bean flour, soya flour and vetch flour, the ratio of the flour to the enzyme being at least about 1 to 2.

3. A desizing agent comprising essentially about 10 to 36% of amylase selected from the group consisting of bacterial amylase and pancreatic amylase, about 20-70% of common salt, about 20 to 25% calcium sulphate and at least one member selected from the group consisting of lupin flour, bean flour, soya flour and vetch flour, the ratio of the flour to the enzyme being at least about 1 to 2.

4. A desizing agent comprising essentially about 10 to 36% of a bacterial amylase, vetch flour and from about 20 to 70% of common salt, the ratio of the flour to the enzyme being at least about 1 to 2.

5. A desizing agent comprising essentially about 10 to 36% of pancreatin powder, lupin flour and from about 20 to 70% of common salt, the ratio of the flour to the enzyme being at least about 1 to 2.

6. A desizing agent comprising essentially about 10 to 36% of pancreatin powder, gypsum, soya flour and from about 20 to 70% of common salt, the ratio of the flour to the enzyme being at least about 1 to 2.

7. A desizing agent comprising essentially about 10 to 36% of pancreatin powder, gypsum, soya flour, lupin flour and from about 20 to 70% of common salt, the ratio of the flour to the enzyme being at least about 1 to 2.

8. A desizing agent comprising essentially about 10 to 36% of pancreatic glands, lupin flour, from about 20 to 70% of common salt and gypsum, the ratio of the flour to the enzyme being at least about 1 to 2.

9. A desizing bath comprising essentially about 10 to 36% of a desizing agent containing amylase selected from the group consisting of bacterial amylase and pancreatic amylase, from about 20 to about 70% common salt, at least one vegetable albumen-containing substance and up to 25% calcium sulphate, the ratio of said albumen-containing substance to amylase being at least about 1 to 2.

10. A desizing bath comprising essentially about 10 to 36% of a desizing agent containing amylase selected from the group consisting of bacterial amylase and pancreatic amylase, from about 20 to about 70% common salt, from 20-25% of calcium sulphate and at least one member selected from the group consisting of lupin flour, bean flour, soya flour and vetch flour, the ratio of the flour to the enzyme being at least about 1 to 2.

11. A desizing bath comprising essentially about 10 to 36% of a desizing agent containing a bacterial amylase, vetch flour and from 20 to 70% of common salt, the ratio of the flour to the enzyme being at least about 1 to 2.

12. A desizing bath comprising essentially about 10 to 36% of a desizing agent containing pancreatin powder, lupin flour and from 20 to 70% of common salt, the ratio of the flour to the enzyme being at least about 1 to 2.

13. A desizing bath comprising essentially about 10 to 36% of a desizing agent containing pancreatin powder, up to 25% of gypsum, soya flour and from 20 to 70% of common salt, the ratio of the flour to the enzyme being at least about 1 to 2.

14. A desizing bath comprising essentially about 10 to 36% of a desizing agent containing pancreatin powder, up to 25% of gypsum, soya flour, lupin flour and from 20 to 70% of common salt, the ratio of the flour to the enzyme being at least about 1 to 2.

15. A desizing bath comprising essentially about 10 to 36% of a desizing agent containing pancreatic glands, lupin flour, from 20 to 70% of common salt and up to 25% of gypsum, the ratio of the flour to the enzyme being at least about 1 to 2.

References Cited in the file of this patent

UNITED STATES PATENTS

| Number | Name | Date |
| --- | --- | --- |
| 1,430,523 | Jenny et al. | Sept. 26, 1922 |
| 1,590,388 | Lepetit | June 29, 1926 |
| 1,716,347 | Riehl et al. | June 4, 1929 |
| 1,735,977 | Rohm | Nov. 19, 1929 |
| 1,959,400 | Withey | May 22, 1934 |
| 2,051,507 | Washmund | Aug. 18, 1936 |
| 2,530,056 | Handler | Nov. 14, 1950 |
| 2,599,867 | Schubert | June 10, 1952 |